(No Model.)
D. C. SCHLABACH.
SAW GAGE.
No. 496,233. Patented Apr. 25, 1893.
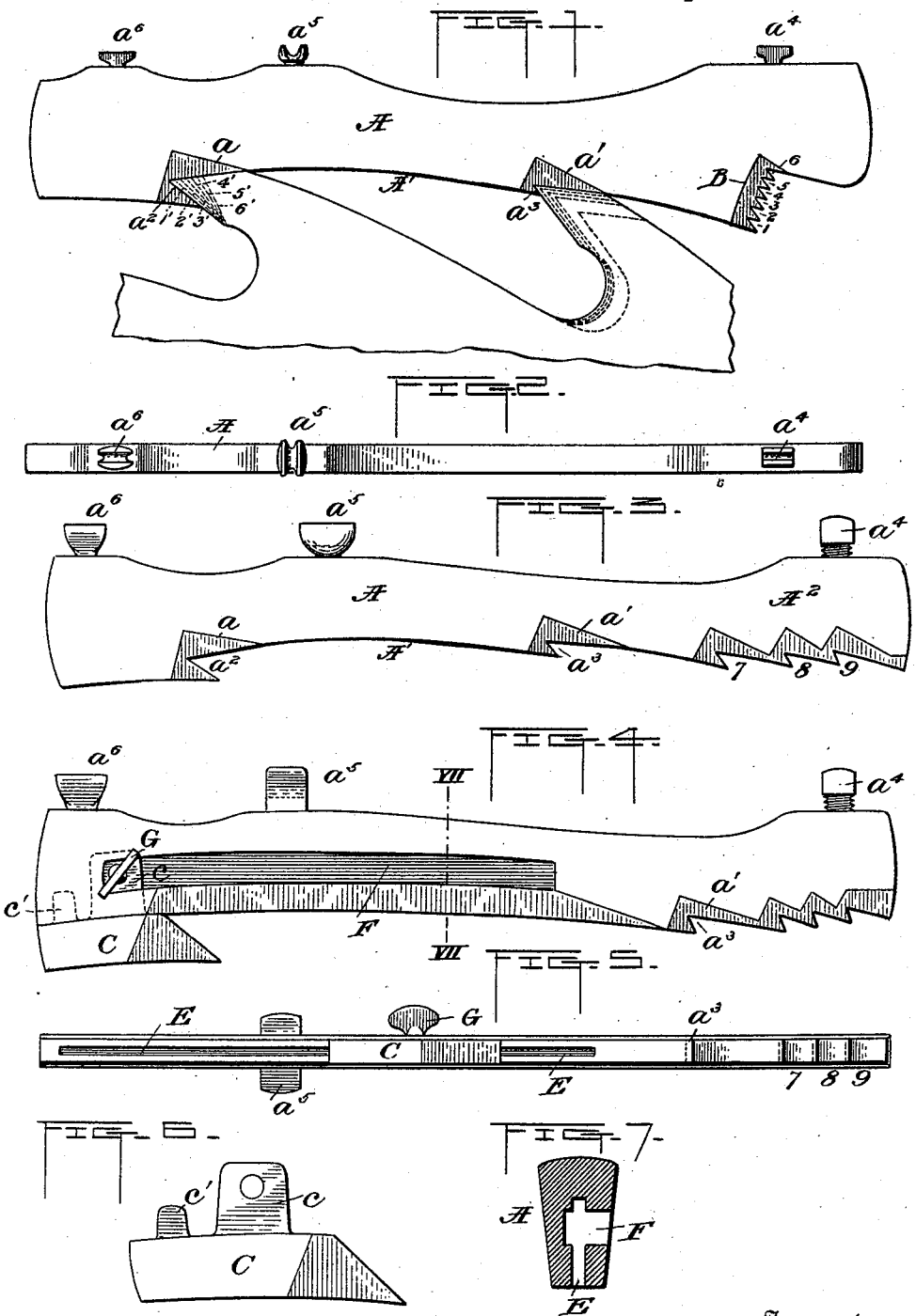

UNITED STATES PATENT OFFICE.

DANIEL C. SCHLABACH, OF FARMERSTOWN, OHIO.

SAW-GAGE.

SPECIFICATION forming part of Letters Patent No. 496,233, dated April 25, 1893.

Original application filed December 8, 1891, Serial No. 414,378. Divided and this application filed July 23, 1892. Serial No. 441,048. (No model.)

*To all whom it may concern:*

Be it known that I, DANIEL C. SCHLABACH, a citizen of the United States, residing at Farmerstown, in the county of Holmes and State of Ohio, have invented certain new and useful Improvements in Saw-Gages; and I do hereby declare the following to be a full, clear, and exact description of the invention, such as will enable others skilled in the art to which it appertains to make and use the same.

My present invention relates to gages for saws; this application being a division of an application filed December 8, 1891, Serial No. 414,373, wherein is described and claimed a circular saw comprising essentially a blade provided with teeth having chisel-like points or teeth proper whose backs or upper edges form chords of a circle touching the extreme ends or points of all the teeth, the upper edge or back of the main portion or body of the tooth extending in a gentle curve from the heel of the tooth proper to the return bend of the gullet, whereby a strong and durable tooth is provided which will cut like a chisel without tearing and scraping the wood, and which may be operated with a comparatively small expenditure of power.

The primary object of the invention is to provide a gage which is specially designed for filing and gumming saws of the character described in my aforesaid application, so as to preserve the shape and contour of the teeth throughout successive filings, and also to give the teeth the necessary "lead."

The invention consists in certain improved features of construction and combinations of parts all as will be hereinafter described and particularly pointed out in the claims at the end of this description.

Referring to the accompanying drawings, in which similar letters of reference are used to denote similar parts in each of the several views, Figure 1 is a side elevation of a gage embodying my invention, illustrating its application to the teeth of a circular saw. Fig. 2 is a top plan of the same. Fig. 3 is a side elevation illustrating a modification of the device shown in Fig. 1. Fig. 4 is a side elevation illustrating another modification. Fig. 5 is a bottom plan of the gage shown in Fig. 4. Fig. 6 is a detail side view of the adjustable gage-block, and Fig. 7 is a transverse section taken on the line VII—VII of Fig. 4.

In filing and gumming the teeth of saws without the aid of a device by which the proper shape of the tooth may be preserved, the effectiveness of the saw is greatly impaired by successive filings. In order to provide means for filing and gumming saws in such manner that the form of the teeth shall be preserved through successive filings, and its strength retained as the metal is reduced, I provide a gage which may consist of a slab or bar A, preferably of wood, and provided on its lower edge with a main V-shaped recess and a spaced recess or series of spaced gage-recesses or notches placed at a suitable distance from the main recess to correspond with the distance between any two teeth of the saw; the main recess being formed in part by an adjustable gage-block if desired to vary the distance between the same and the series of notches so as to adapt the gage to be used with saws of different sizes.

$a$, $a'$ denote metallic fillings which may be let into the wooden bar A on the lower edge thereof. The filling $a$ is formed with a V-shaped recess $a^2$ of a size and shape corresponding with the size and shape of the tooth or tooth point to be filed. The filling $a'$ is provided with a notch or shoulder as at $a^3$ and is adapted to rest upon a tooth of a saw while the main recess $a^2$ is fitted upon the tooth immediately in advance thereof. The V-shaped recess $a^2$ being constructed to exactly correspond with the shape of the tooth point, the gage may be fitted to the saw with the filling $a'$ resting upon any tooth and the filling $a$ will exactly fit the tooth next in advance thereof as indicated in Fig. 1. The lower edges of the respective fillings are inclined to correspond with the different inclinations given the backs of the teeth, or tooth-points, so that when the teeth are filed to correspond with the gage their backs or upper edges after filing, will still form the chords of a circle touching the points of all the teeth, while the lower edges of the tooth-points will have the proper inclination to retain sufficient metal to give the required strength at the base of the point.

To vary the shape and pitch of the teeth, the gage may be provided with a vertically disposed series of recesses or notches 1, 2, 3, 4, 5, 6, formed in a metallic filling B, Fig. 1, or a series of similarly spaced recesses or notches at the rear of the filling $a'$, as shown in Figs. 3 and 4.

The notches of the filling B are placed one above another about one-eighth to three-sixteenths of an inch deep. The lower edge A′ of the gage at the rear of the filling $a$ is made straight for some distance so that in commencing to file the teeth of a saw any one of the series of notches of the filling B may be made to engage the point of a tooth with said straight edge resting upon another tooth in front of the filling $a'$, and there upon the back or upper edge of the tooth upon which the gage rests may be filed to correspond with the inclination of the straight edge of the gage. This being done, the filling $a'$ may then be fitted upon the filed tooth, and the tooth next in advance of said filed tooth may thereupon be filed to correspond with the V-shaped recess or notch in the filling $a$, with the inclined edge of the filling $a'$ resting upon the previously filed tooth, and this operation may be continued from tooth to tooth until all the teeth of the saw are filed to correspond with the first filed tooth. The notches of the filling B are used only in starting, for the purpose of changing the shape and pitch of the teeth, and the desired pitch is determined by the difference in inclination given the straight edge of the gage by means of the series of spaced notches. The triangular point of the tooth may be reduced by successive filings as indicated in dotted lines in Fig. 1, by shifting the gage from notch to notch. A very slight change in the shape of the cutting edge or point of the tooth will be made when the tooth is placed in the first or lower notch of the gage, and correspondingly slight changes may be made by shifting the tooth from notch to notch.

As the teeth become worn they may be filed and reduced by successive filings as indicated by the dotted lines $x$ $x$ at the right of Fig. 1, without changing the inclination of the cutting edges or the configuration of the tooth, by merely using the V-shaped recess and notched or shouldered filling $a'$, but to change the pitch or "lead" of the tooth, the notches of the filling B, are employed; the differences in the results being indicated by the dotted lines at the left of said figure, wherein the lines 1′, 2′, 3′, 4′, 5′, 6′, show the amount of reduction corresponding with the difference in shape determined by engaging the teeth in different notches in starting, and filing in the manner above indicated.

Instead of arranging the series of notches one above another in a slightly inclined position as indicated in Fig. 1, the gage may be formed with a rearward extension $A^2$ as indicated in Figs. 3, 4 and 5, and a series of metallic fillings may be provided with a single notch in each, so arranged with relation to the lower edge of the gage as to accomplish the reduction of the tooth by successive filings the same as with the vertically disposed notches of the filling B. The gage may also be provided with a longitudinally adjustable gage-block C, forming one-half of the main V-shaped recess to adapt the gage to saws of different sizes. The block C, has an upright arm $c$, which extends through a longitudinal slot E, in the lower edge or bottom of the gage bar, and said slot intersects a slightly curved lateral slot or groove F, extending into the body of the bar a sufficient distance to permit a set screw G, to enter the upright arm $c$ for the purpose of holding the gage-block in position; this attachment permitting the gage-block to be slid back and forth so as to vary the distance between the main recess and any one of the series of notches 7, 8, 9, in the extension $A^2$ of the bar A, to correspond with the distance between the two fillings $a$, $a'$, Fig. 1. By this means the gage-block may be adjusted so as to adapt the gage to fit upon any two teeth when the rearmost tooth is engaged by any one of the series of notches 7, 8, 9. To steady and guide the gage-block C in its movements, a stud or projection $c'$ may also be formed upon the shank thereof so as to engage the vertical slot E in rear of the arm $c$. The bar A, may also be provided with studs or projections $a^4$, $a^5$, $a^6$, on the upper edge thereof, to form a set gage for opening the saw teeth. When the studs $a^4$, $a^5$ are placed against the side of the saw blade with the stud $a^6$ beside a tooth, said tooth may be bent laterally until it touches the stud $a^6$, and by thus bending the teeth alternately in opposite directions the saw may be evenly opened.

Having thus fully described my invention, what I claim as new, and desire to secure by Letters Patent of the United States, is—

1. A saw gage comprising a bar having on its lower edge a V-shaped recess and a notch or shoulder at a distance from said recess corresponding with the distance between two adjacent teeth of the saw blade; said recess and notch being adapted to engage two adjacent teeth and the edges thereof in contact with the backs of the teeth being inclined so that the backs of the teeth or tooth points after filing shall form the chords of a circle touching the points of all the teeth, substantially as described.

2. A saw gage comprising a bar having two or more metallic fillings placed at a distance apart thereon corresponding with the distance between two teeth of the saw blade, one filling being notched or shouldered and adapted to fit over a tooth, and the other filling provided with a recess constructed to correspond with the shape of the tooth and adapted to fit an adjacent tooth; the contacting surfaces of the fillings being made to correspond with the inclined backs or upper edges of the teeth, and a series of notches at the rear of the notched filling for gaging the shape and pitch of the teeth, substantially as described.

3. In combination with the gage bar having the series of notches therein for gaging the shape and pitch of the teeth, the adjustable gage-block, and means for securing the same in any desired position, so as to adapt the gage to fit saws of different sizes, substantially as described.

4. A saw gage comprising the gage bar, having the V-shaped recess in the lower edge thereof and the spaced notches in rear of said recess, together with the studs projecting from the opposite edge of the bar and forming a set gage, substantially as described.

In testimony whereof I affix my signature in presence of two witnesses.

DANIEL C. SCHLABACH.

Witnesses:
BENJAMIN HELMUTH,
JOIN J. YODER.